United States Patent
Matsushima et al.

(10) Patent No.: US 8,949,006 B2
(45) Date of Patent: Feb. 3, 2015

(54) KNOCK CONTROL APPARATUS FOR INTERNAL COMBUSTION ENGINE

(75) Inventors: Yuhei Matsushima, Chiyoda-ku (JP);
Hideki Hagari, Chiyoda-ku (JP);
Toshikatsu Saito, Chiyoda-ku (JP);
Keitaro Ezumi, Aki-gun (JP);
Tomokuni Kusunoki, Aki-gun (JP)

(73) Assignees: Mitsubishi Electric Corporation, Tokyo (JP); Mazda Motor Corporation, Hiroshima (JP)

( * ) Notice: Subject to any disclaimer, the term of this patent is extended or adjusted under 35 U.S.C. 154(b) by 491 days.

(21) Appl. No.: 13/251,939

(22) Filed: Oct. 3, 2011

(65) Prior Publication Data

US 2012/0080008 A1 Apr. 5, 2012

(30) Foreign Application Priority Data

Oct. 4, 2010 (JP) ................................ 2010-224705

(51) Int. Cl.
| | |
|---|---|
| *G06F 19/00* | (2011.01) |
| *G06G 7/70* | (2006.01) |
| *F02P 5/152* | (2006.01) |
| *F02D 41/24* | (2006.01) |
| *F02D 35/02* | (2006.01) |
| *F02D 41/28* | (2006.01) |

(52) U.S. Cl.
CPC ............. *F02P 5/152* (2013.01); *F02D 41/2451* (2013.01); *F02D 35/027* (2013.01); *F02D 2041/286* (2013.01); *F02D 2041/288* (2013.01); *Y02T 10/46* (2013.01)
USPC ................ 701/111; 123/406.21; 123/406.29; 123/406.37

(58) Field of Classification Search
USPC .......... 123/435, 494, 406.21, 406.29, 406.34, 123/406.37, 406.38, 406.39; 701/102, 111; 73/35.01, 35.03, 35.04, 35.07–35.13
See application file for complete search history.

(56) References Cited

U.S. PATENT DOCUMENTS

| | | | | |
|---|---|---|---|---|
| 5,355,853 | A * | 10/1994 | Yamada et al. | 123/406.38 |
| 6,877,482 | B2 * | 4/2005 | Kinose | 123/406.29 |
| 7,054,735 | B2 * | 5/2006 | Masuda et al. | 701/111 |
| 7,219,006 | B2 * | 5/2007 | Takemura et al. | 701/111 |
| 7,243,529 | B2 * | 7/2007 | Takemura et al. | 73/35.09 |

(Continued)

FOREIGN PATENT DOCUMENTS

| | | |
|---|---|---|
| JP | 2005-299580 A | 10/2005 |
| JP | 2005-307753 A | 11/2005 |

*Primary Examiner* — Stephen K Cronin
*Assistant Examiner* — Joseph Dallo
(74) *Attorney, Agent, or Firm* — Sughrue Mion, PLLC (57) ABSTRACT

A knock control apparatus for internal combustion engine includes: a knock signal normalization unit that normalizes a knock signal extracted from an output signal of a knock sensor; a knock determination threshold setting unit that sets a knock determination threshold on the basis of the normalized knock signal; a knock intensity computation unit that calculates knock intensity on the basis of the normalized knock signal and the set knock determination threshold; a knock determination unit that determines a presence or absence of a knock on the basis of the calculated knock intensity; and a knock correction amount computation unit that calculates a knock correction amount to correct the calculated knock intensity in a case where an occurrence of a knock is determined. The knock signal normalization unit normalizes a standard deviation of the knock signal by dividing the knock signal by an average value of the knock signal.

11 Claims, 6 Drawing Sheets

(56) References Cited

U.S. PATENT DOCUMENTS

| | | | |
|---|---|---|---|
| 7,281,516 B2 * | 10/2007 | Kaneko et al. | 123/406.38 |
| 7,853,400 B2 * | 12/2010 | Matsushima et al. | 701/111 |
| 8,302,462 B2 * | 11/2012 | Kaneko et al. | 73/35.09 |
| 2005/0234633 A1 * | 10/2005 | Takemura et al. | 701/111 |
| 2006/0142925 A1 * | 6/2006 | Kaneko et al. | 701/111 |
| 2009/0217908 A1 * | 9/2009 | Watanabe et al. | 123/406.37 |
| 2010/0212634 A1 * | 8/2010 | Yoshihara et al. | 123/406.24 |

* cited by examiner

- START — S101
- KNOCK SIGNAL
- CALCULATE AVERAGE VALUE OF $V_{SIG}$ — S102
  $V_{ASIG}[n] = K_{ASIG} \times V_{ASIG}[n-1] + (1 - K_{ASIG}) \times V_{SIG}[n]$
- STANDARD DEVIATION NORMALIZATION UNIT — S103
  $V_{NSGM} = V_{SIG}/V_{ASIG}$

※USE $V_{NAVE}$ AS INPUT FOR SECOND AND SUBSEQUENT TIMES

- CALCULATE AVERAGE VALUE OF $V_{NSGM}$ — S104
  $V_{ASGM}[n] = K_{ASGM} \times V_{ASGM}[n-1] + (1 - K_{ASGM}) \times V_{NSGM}[n]$
- AVERAGE VALUE NORMALIZATION UNIT — S105
  $V_{NAVE} = V_{NSGM} + (1 - V_{ASGM})$
- REPEAT PREDETERMINED NUMBER OF TIMES — S106
- POST-NORMALIZATION KNOCK SIGNAL — S107

{ KNOCK SIGNAL NORMALIZATION UNIT }

- KNOCK DETERMINATION THRESHOLD SETTING UNIT — S108
  KNOCK DETERMINATION THRESHOLD $V_{TH}[n] = V_{BGL} + K_{TH} \times S_{GM}[n]$
  <BGL> $V_{BGL}[n] = K_{BGL} \times V_{BGL}[n-1] + (1 - K_{BGL}) \times V_{NRM}[n]$
  <VARIANCE> $V_{AR}[n] = K_{VAR} \times V_{VAR}[n-1] + (1 - K_{VAR}) \times (V_{NRM}[n] - V_{BGL}[n])^2$
  <STANDARD DEVIATION> $S_{GM}[n] = V_{AR}[n])^{1/2}$
- KNOCK INTENSITY COMPUTATION UNIT — S109
  $I_{KNKN}[n] = (V_{NRM}[n] - V_{BGL}[n]) / (V_{TH}[n] - V_{BGL}[n])$
- KNOCK DETERMINATION UNIT — S110
- KNOCK CORRECTION AMOUNT COMPUTATION UNIT — S111
  $R_{TD}[n] = I_{KNKN}[n] / (K_{IKNK} \times V_{ASIG}[n])$
- END

KNOCK CONTROL APPARATUS FOR INTERNAL COMBUSTION ENGINE

BACKGROUND OF THE INVENTION

1. Field of the Invention

The present invention relates to a knock control apparatus that controls a knock occurring in an internal combustion engine.

2. Background Art

There has been an apparatus that detects a knock phenomenon occurring in an internal combustion engine by a vibration sensor (hereinafter, referred to as the knock sensor) directly installed to the block of the internal combustion engine. When a knock occurs while the internal combustion engine is running, vibrations in a specific frequency band corresponding to a bore diameter of the internal combustion engine and a vibrational mode of a knock are known to occur. The apparatus therefore detects a knock by measuring vibration intensity at this specific frequency.

There is also a knock control apparatus that suppresses a knock by correcting a spark timing to be on the retard side when a knock is detected and minimizes a torque reduction by returning a spark timing to be back on the advance side when no knock is detected. As a characteristic of the internal combustion engine, it is known that an output torque of the internal combustion engine is enhanced whereas a knock occurs readily when a spark timing is advanced and conversely an output torque of the internal combustion engine is reduced whereas a knock hardly occurs when a spark timing is retarded. This knock control apparatus therefore controls the internal combustion engine to run at a knock limit spark timing at which a torque is generated best while suppressing the occurrence of a knock by correcting a spark timing to be on the retard side when a knock is detected and by returning a spark timing to be back on the advance side when no knock is detected. It should be noted, however, that there is a case where no knock occurs when a spark timing is advanced to the extent at which a torque reaches the maximum while the internal combustion engine is run by a low load. The knock control described above is not necessary in such a running region.

In the knock control apparatus for internal combustion engine as described above, typically, there are cases where a threshold to determine the occurrence of a knock is set using a gain and an offset that are preliminarily matched to an average value of a knock signal calculated by filtering the knock signal and where the threshold is set using an average value and a standard deviation of a knock signal calculated by the filtering. However, when the running condition of the internal combustion engine changes, so do the average value and the standard deviation of the knock signal. This poses problems, such as a large number of man-hours for matching processing are involved to match the gain or the like in response to such a change and a knock is detected erroneously or left undetected because the threshold is not set appropriately.

Figure 7:
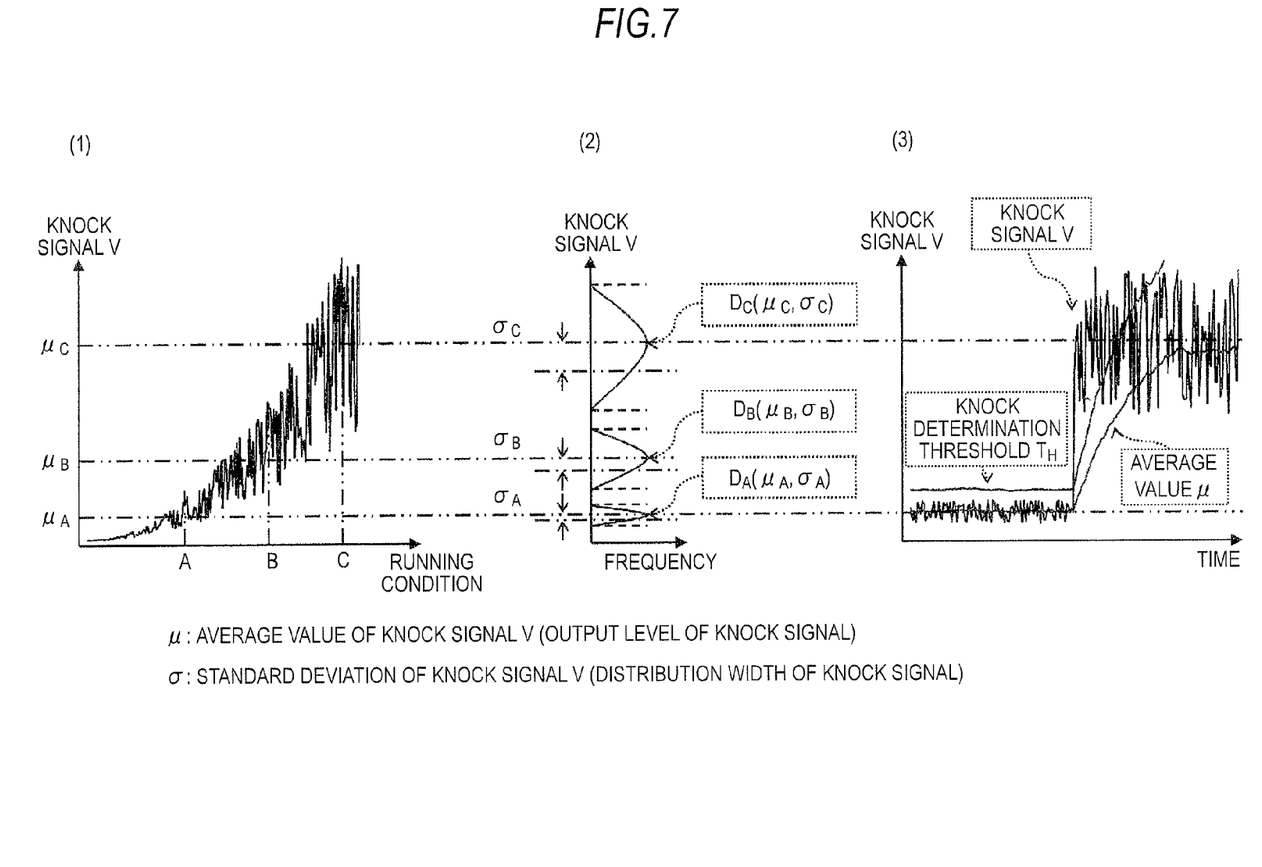
FIG. 7 is a view showing images used to describe a knock signal distribution in different running conditions of the internal combustion engine and knock detection by an apparatus in the related art.

These problems will now be described more in detail using the drawing. FIG. 7 is a view showing images used to describe a knock signal distribution in different running conditions of the internal combustion engine and knock detection by an apparatus in the related art. Herein, (1) shows a state where a knock signal V changes in response to changes of the running conditions A through C, (2) shows a distribution profile of the knock signal V in the running conditions A through C, and (3) shows a behavior of a knock determination threshold $T_H$ in a knock control apparatus in the related art in a case where the running condition changes from A to B to C.

As are shown in (1) and (2) in FIG. 7, when the running condition changes from A→B→C, an average value $\mu$ of the knock signal V changes from $\mu_A \to \mu_B \to \mu_C$ and a standard deviation $\sigma$ changes from $\sigma_A \to \sigma_B \to \sigma_C$. In other words, as the running condition changes from A→B→C, the distribution profile D of the knock signal V changes from $D_A$ ($\mu_A$, $\sigma_A$)→$D_B$ ($\mu_B$, $\sigma_B$)→$D_C$ ($\mu_C$, $\sigma_C$).

A setting method of the knock determination threshold $T_H$ in the knock control apparatus in the related art will now be described. Initially, a knock signal V[n] is subjected to weighed-averaging in accordance with an equation below by interruption processing for every ignition to calculate an average value $\mu$[n] of the knock signal V[n]:

$$\mu[n]=K_\mu \times V[n-1]+(1-K_\mu) \times V[n]$$

where V is a knock signal, $K_\mu$ is a filter coefficient, and n is the number of interruption processing times (positive integer).

Subsequently, a variance $\sigma[n]^2$ of the knock signal V[n] is calculated by weighed-averaging in accordance with an equation below using the calculated average value $\mu$[n] of the knock signal V[n] and the knock signal V[n]:

$$\sigma[n]^2=K_{\sigma 2} \times \sigma[n-1]^2+(1-K_{\sigma 2}) \times (V-\mu)[n]^2$$

where $K_{\sigma 2}$ is a filter coefficient for variance calculation.

As is shown in an equation below, a standard deviation $\sigma$[n] of the knock signal V is calculated by calculating the square root of the calculated variance $\sigma[n]^2$ of the knock signal V[n]:

$$\sigma[n]=(\sigma[n]^2)^{1/2}.$$

The knock determination threshold $T_H$ is calculated in accordance with an equation below using the calculated average value $\mu$[n] and standard deviation $\sigma$[n] of the knock signal V [n]:

$$T_H[n]=\mu[n]+K_{TH} \times \sigma[n]$$

where $K_{TH}$ is a coefficient for threshold calculation.

The filter coefficient $K_\mu$ and the filter coefficient $K_{\sigma 2}$ for variance calculation used in the equations above are set in such a manner that in a case where the running condition of the internal combustion engine changes, the filter coefficients follow quickly in a transition period of such a change and slowly during a knock determination.

In the case of the knock control apparatus in the related art, as is shown in (3) in FIG. 7, when the running condition has changed from A to C, it is necessary to closely match the respective filter coefficients to the average value $\mu$ and the standard deviation $\sigma$ that have changed to let a behavior of the knock determination threshold $T_H$ follow the changes of the average value $\mu$ and the standard deviation $\sigma$ of the knock signal V. Further, as has been described, because the filter coefficients are set so that the respective filters follow slowly during a knock determination, in a case where the occurrence of a knock is determined erroneously as the knock signal V exceeds the knock determination threshold $T_H$, there is a problem that a wrong knock determination is continued.

To eliminate such an inconvenience, there has been proposed a control apparatus for internal combustion engine configured to suppress changes of an average value and a standard deviation of a knock signal in response to a change of the running condition of the internal combustion engine by normalization (standardization, dimensionless transformation) of the knock signal (see, for example, Patent Documents 1 and 2).

The apparatuses in the related art described in Patent Documents 1 and 2 are configured to suppress changes of an average value and a standard deviation of a knock signal caused by the running condition of the internal combustion engine by normalizing the knock signal according to a typical standardization procedure expressed by an equation below using the average value and the standard deviation of the knock signal:

$$Z=(V-\mu)/\sigma$$

where Z is a post-normalization knock signal.

Patent Document 1: JP-A-2005-299580
Patent Document 2: JP-A-2005-307753

According to the apparatuses in the related art described in Patent Documents 1 and 2, a knock signal is normalized (standardized) to an average value [$\mu=0$] and a standard deviation [$\sigma=1$] independently of the running condition of the internal combustion engine. However, because a change rate of the standard deviation $\sigma$ is large at the occurrence of a knock, a vibrational component due to the occurrence of a knock is normalized, too. Consequently, a signal-to-noise ratio is lowered, which poses a problem that knock control performance becomes poor. Also, because it is necessary for normalization to calculate the standard deviation $\sigma$, calculations of a square and a square root are necessary to calculate a standard deviation $\sigma$ of a knock signal separately from the knock determination threshold. This poses a problem that not only a processing load on an arithmetic device is increased, but also man-hours for matching processing necessary for calculation are increased. Further, as is shown in (3) in FIG. 7, there is a delay in calculation of an average value $\mu$ of the knock signal V when the running condition of the internal combustion engine changes. Hence, there is a problem that while the running condition of the internal combustion engine is changing, the standard deviation $\sigma$ calculated from the knock signal V and an average value $\mu$ thereof becomes less accurate (it is calculated a little too large).

SUMMARY OF THE INVENTION

The invention was devised to solve the problems with the apparatuses in the related art as discussed above and has an object to provide a knock control apparatus for internal combustion engine configured to enhance knock control performance by suppressing changes of an average value and a standard deviation of a knock signal in response to a change of the running condition of the internal combustion engine without deteriorating the knock control performance and increasing a processing load on an arithmetic device and matching man-hours.

A knock control apparatus for an internal combustion engine according to an aspect of the invention includes: a knock sensor that detects a vibration caused by a knock of the internal combustion engine; a knock signal normalization unit that normalizes a knock signal extracted from an output signal of the knock sensor; a knock determination threshold setting unit that sets a knock determination threshold on the basis of the normalized knock signal; a knock intensity computation unit that calculates knock intensity on the basis of the normalized knock signal and the set knock determination threshold; a knock determination unit that determines a presence or absence of a knock on the basis of the calculated knock intensity; and a knock correction amount computation unit that calculates a knock correction amount to correct the calculated knock intensity in a case where an occurrence of a knock is determined by the knock determination unit. The knock signal normalization unit normalizes a standard deviation of the knock signal by dividing the knock signal by an average value of the knock signal.

According to the knock control apparatus for an internal combustion engine of the invention, by dividing the knock signal by an average value, which is highly correlated to a standard deviation of the knock signal but a change rate thereof at the occurrence of a knock is smaller than that of the standard deviation, it becomes possible, most importantly, to suppress only a change of the standard deviation of the knock signal in response to a change of the running condition at high accuracy without normalizing also a vibrational component caused by the occurrence of a knock. In addition, it becomes possible to normalize the average value of the knock signal to substantially "1". Further, because there is no need to calculate a standard deviation of the knock signal for normalization, a processing load can be lessened. Furthermore, because there is no need to set a constant for standard deviation calculation, man-hours for matching processing can be reduced.

The foregoing and other object, features, aspects, and advantages of the present invention will become more apparent from the following detailed description of the present invention when taken in conjunction with the accompanying drawings.

DESCRIPTION OF THE PREFERRED EMBODIMENT

First Embodiment

Figure 1:
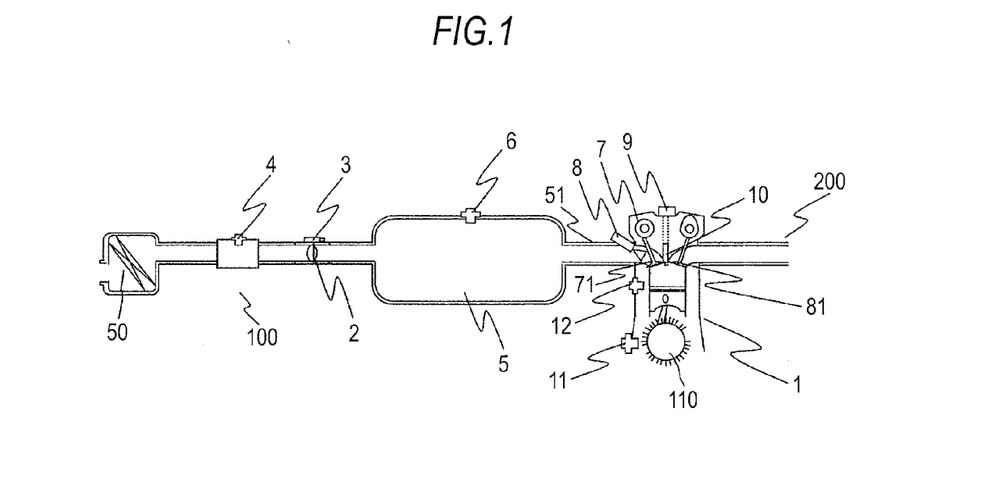
FIG. 1 is a view schematically showing the configuration of an overall internal combustion engine to which a knock control apparatus for an internal combustion engine according to a first embodiment of the invention is applied.

Hereinafter, a knock control apparatus for internal combustion engine according to a first embodiment of the invention will be described in detail with reference to the drawings. FIG. 1 is a view schematically showing the configuration of an overall internal combustion engine to which the knock control apparatus for internal combustion engine according to the first embodiment of the invention is applied. Although the internal combustion engine for vehicle, such as an automobile, normally includes a plurality of cylinders and pistons, only one cylinder and one piston are shown in FIG. 1 for ease of description.

Referring to FIG. 1, an air filter 50 is provided upstream of an inlet system 100 of an internal combustion engine 1 and a surge tank 5 that stores air taken in through the air filter is provided downstream thereof. The surge tank 5 is connected to a plurality of cylinders of the internal combustion engine 1 via an intake manifold 51.

An electronically-controlled throttle valve 2 provided upstream of the surge tank 5 adjusts an intake air flow of the inlet system 100 as the opening thereof is controlled electronically. An air flow sensor 4 provided upstream of the electrically-controlled throttle valve 2 measures an intake air flow in the inlet system 100 and outputs an intake air flow signal corresponding to the measured value.

A throttle opening sensor 3 measures the opening of the electrically-controlled throttle valve 2 and outputs a throttle valve opening signal corresponding to the measured value. A mechanical throttle valve directly connected to an unillustrated accelerator pedal with a wire may be used instead of the electronically-controlled throttle valve 2.

An intake manifold pressure sensor 6 provided to the surge tank 5 measures an internal intake pressure of the surge tank 5 and hence an internal intake pressure of the intake manifold 51 and outputs an intake manifold pressure signal corresponding to the measured value. In the first embodiment, both the air flow sensor 4 and the intake manifold pressure sensor 6 are provided. However, either of these sensors alone may be provided.

An inlet valve 71 is provided to an inlet port formed downstream of the surge tank 5 and opening and closing timings thereof are under variable control of a variable intake valve mechanism 7. An injector 8 that ejects fuel is provided to the intake port. The injector 8 may be provided in such a manner so as to eject fuel directly into the cylinder of the internal combustion engine 1.

An ignition coil 9 that ignites an air-fuel mixture inside the cylinder and an ignition plug 10 formed integrally with the ignition coil 9 are provided to a cylinder head of the internal combustion engine 1. Also, a plate 110 with a plurality of edges formed on the peripheral surface at predetermined intervals is provided to the crankshaft of the internal combustion engine 1. A crank angle sensor 11 is provided oppositely to the edges of the plate 110 so that it detects the edges of the plate 110 rotating with the crankshaft and outputs a pulse signal in synchronization with installation intervals of the respective edges. A knock sensor 12 provided to the internal combustion engine 1 outputs a vibrational waveform signal according to a vibration of the internal combustion engine 1.

An exhaust valve 81 provided to an exhaust port of the cylinder opens so that an exhaust gas is emitted from inside of the cylinder to an exhaust system 200. A catalytic device (not shown) that purifies the exhaust gas is provided downstream of the exhaust system 200.

Figure 2:
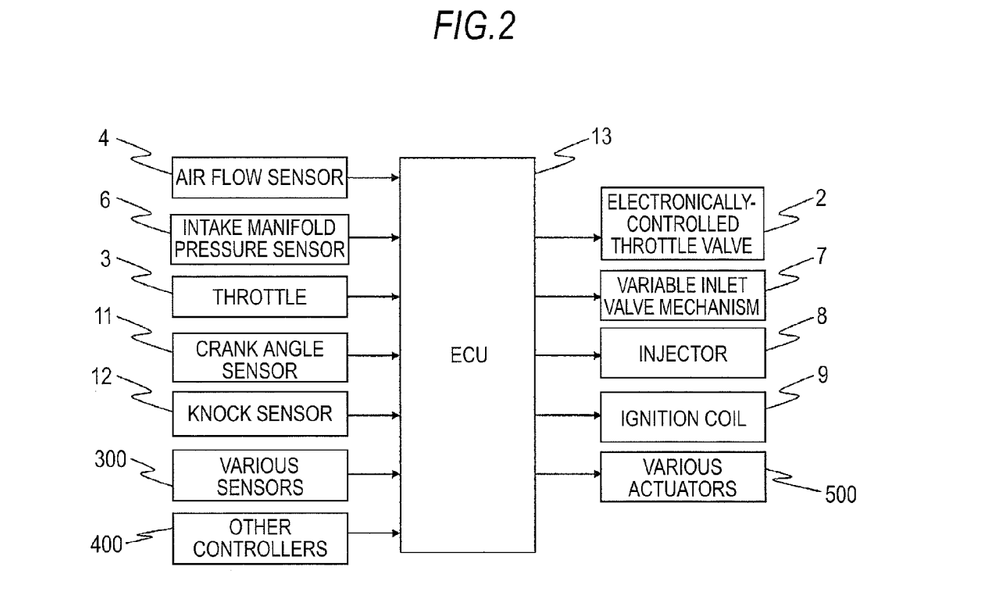
FIG. 2 is a block diagram showing the configuration of the knock control apparatus for an internal combustion engine according to the first embodiment of the invention.

FIG. 2 is a block diagram showing the configuration of the knock control apparatus for internal combustion engine according to the first embodiment of the invention. Referring to FIG. 2, an electronic control unit (hereinafter, abbreviated as ECU) 13 of the internal combustion engine 1 is formed of an arithmetic device, such as a micro computer, and an intake air flow signal outputted from the air flow sensor 4, an intake manifold pressure signal outputted from the intake manifold pressure sensor 6, a throttle valve opening signal outputted from the throttle opening sensor 3, a pulse signal in synchronization with installment intervals of the edges of the plate 110 outputted from the crank angle sensor 11, and a vibrational waveform signal of the internal combustion engine 1 outputted from the knock sensor 12 are individually inputted therein.

Besides the signals described above, signals corresponding to respective measured values from other unillustrated various sensors 300 are also inputted into the ECU 13. Further, signals from other controllers 400, for example, an automatic transmission control system, a brake control system, and a traction control system, are also inputted therein.

The ECU 13 calculates a target throttle opening on the basis of the accelerator opening and the running condition of the internal combustion engine 1 and controls the opening of the electrically-controlled throttle valve 2 on the basis of the calculated target throttle opening. Also, the ECU 13 not only variably controls the opening and closing timings of the inlet valve 71 by controlling the variable inlet valve mechanism 7 according to the running condition of the internal combustion engine 1 but also controls a fuel injection amount by driving the injector 8 so as to reach a target air-fuel ratio. Further, the ECU 13 controls a spark timing by controlling energization to the ignition coil 9 so as to achieve a target spark timing.

Also, in a case where a knock in the internal combustion engine 1 is detected as will be described below, the ECU 13 also performs control to suppress the occurrence of a knock by setting the target spark timing to be on the retard side. Further, the ECU 13 calculates an instruction value to control various actuators 500 other than those described above and controls the various actuators 500 on the basis of the instruction value.

Figure 3:
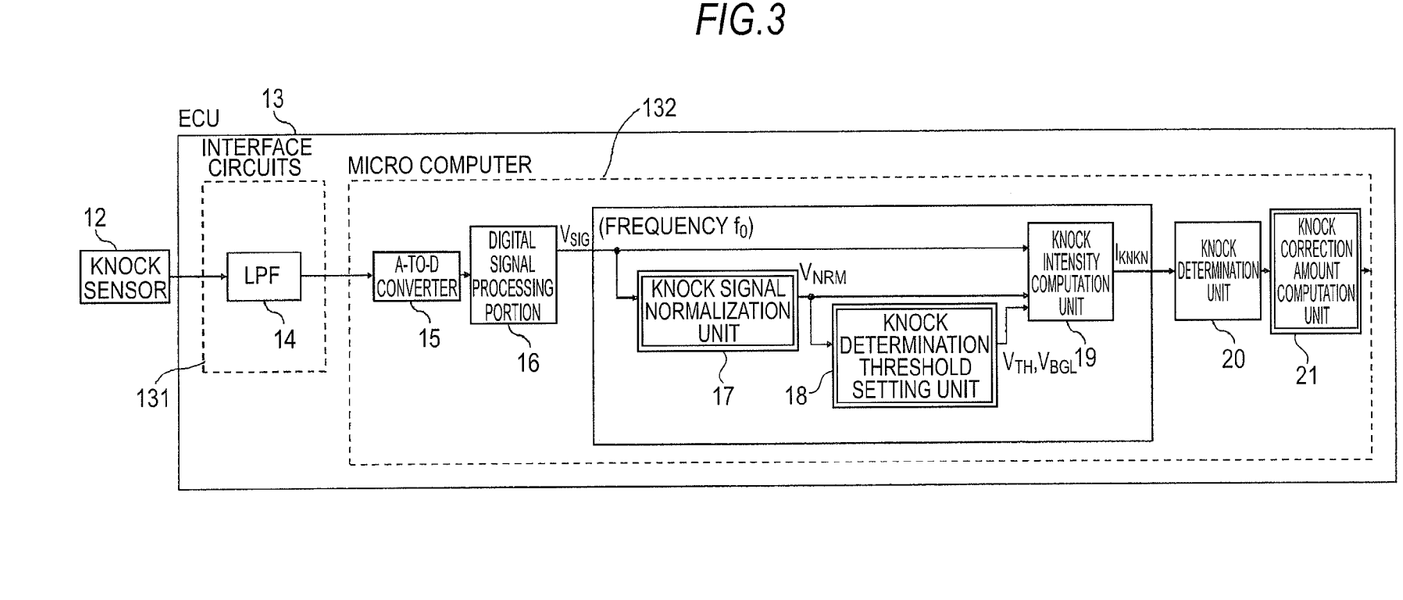
FIG. 3 is a block diagram showing the configuration of a knock control portion in the knock control apparatus for an internal combustion engine according to the first embodiment of the invention.

The configuration and an operation of a knock control portion formed within the ECU 13 will now be described. FIG. 3 is a block diagram showing the configuration of the knock control portion in the knock control apparatus for internal combustion engine according to the first embodiment of the invention. Referring to FIG. 3, the knock control portion formed within the ECU 13 includes various interface (I/F) circuits 131 and a micro computer 132. An interface circuit for knock control in the various interface circuits 131 includes a low-pass filter (hereinafter, abbreviated as LPF) 14 that receives a vibrational waveform signal of the internal combustion engine 1 outputted from the knock sensor 12 and eliminates a high-frequency component from the vibrational waveform signal.

The micro computer 132 as a whole is formed of an Analog-to-Digital converter 15 that converts an analog signal to a digital signal, a ROM region in which to store a control program and a control constant, a RAM region in which to store a variable when a program is executed and the like. The knock control portion includes the Analog-to-Digital converter 15, a digital signal processing portion 16, a knock signal normalization unit 17, a knock determination threshold setting unit 18, a knock intensity computation unit 19, a knock determination unit 20, and a knock correction amount computation unit 21.

As has been described, the LPF 14 receives a vibrational waveform signal of the internal combustion engine 1 outputted from the knock sensor 12 and eliminates a high-frequency component from the vibrational waveform signal. However, for the Analog-to-Digital converter 15 to take in the entire vibrational component, it is configured in such a manner that the center of the vibrational component is set to 2.5 [V], for example, by adding a bias of 2.5 [V], so that the vibrational component falls within the range from 0 [V] to 5 [V] having a center thereof at 2.5 [V]. The LPF 14 is also furnished with a gain conversion function of amplifying the vibrational component with its center at 2.5 [V] in a case where the vibrational component of a vibrational signal from the knock sensor 12 is small and reducing the vibrational component with a center thereof at 2.5 [V] when the vibrational component is large.

The Analog-to-Digital converter 15 converts an analog vibrational waveform signal, which is obtained by eliminating a high-frequency component from a vibrational waveform signal from the knock sensor 12 in the LPF 14, to a digital signal: A-to-D conversion by the Analog-to-Digital converter 15 is executed at certain time intervals, for example, in every 10 [μs] or every 20 [μs].

It may be configured in such a manner that the Analog-to-Digital converter 15 constantly performs Analog-to-Digital conversion on an analog signal from the LPF 14 and only data in a period during which a knock occurs in the internal combustion engine 1, for example, a knock detection period set from a top death center (hereinafter, abbreviated as TDC) of the piston to 50° CA after a top death center (hereinafter, abbreviated as ATDC), is sent to and beyond the digital signal processing portion 16. Alternatively, it may be configured in such a manner that A-to-D conversion is performed only in a knock detection period set, for example, from TDC to 50° CA ATDC to send the data in this period to and beyond the digital signal processing portion 16.

Subsequently, the digital signal processing portion 16 performs a time and frequency analysis on a digital signal inputted therein from the Analog-to-Digital converter 15. To be more concrete, a spectral sequence of a knock-specific frequency component in every predetermined time is calculated by processing, for example, discrete Fourier transform (DFT) or short-time Fourier transform (STFT). As the digital signal processing by the digital signal processing portion 16, a knock-specific frequency component may be extracted using an infinite impulse response (IIR) filter or a finite impulse response (FIR) filter.

The digital signal processing portion 16 starts the processing after the completion of the Analog-to-Digital conversion by the Analog-to-Digital converter 15 during the knock detection period described above and ends the processing before the start of interruption processing in synchronization with a crank angle (for example, interruption processing at 75° CA before a top death center, which is hereinafter abbreviated as BTDC), by which processing from the one by the knock signal normalization unit 17 to the one by the knock correction amount computation portion 21 described below is performed.

The digital signal processing portion 16 calculates a spectrum of a plurality of different knock-specific frequency components and calculates a value correlated to knock intensity $I_{KNKN}$ described below as a knock signal $V_{SIG}$. Herein, a peak value or an average value in the knock detection period described above may be used as the knock signal $V_{SIG}$. Subsequent processing is performed using the knock signal $V_{SIG}$ calculated by the digital signal processing portion 16.

Figure 4:
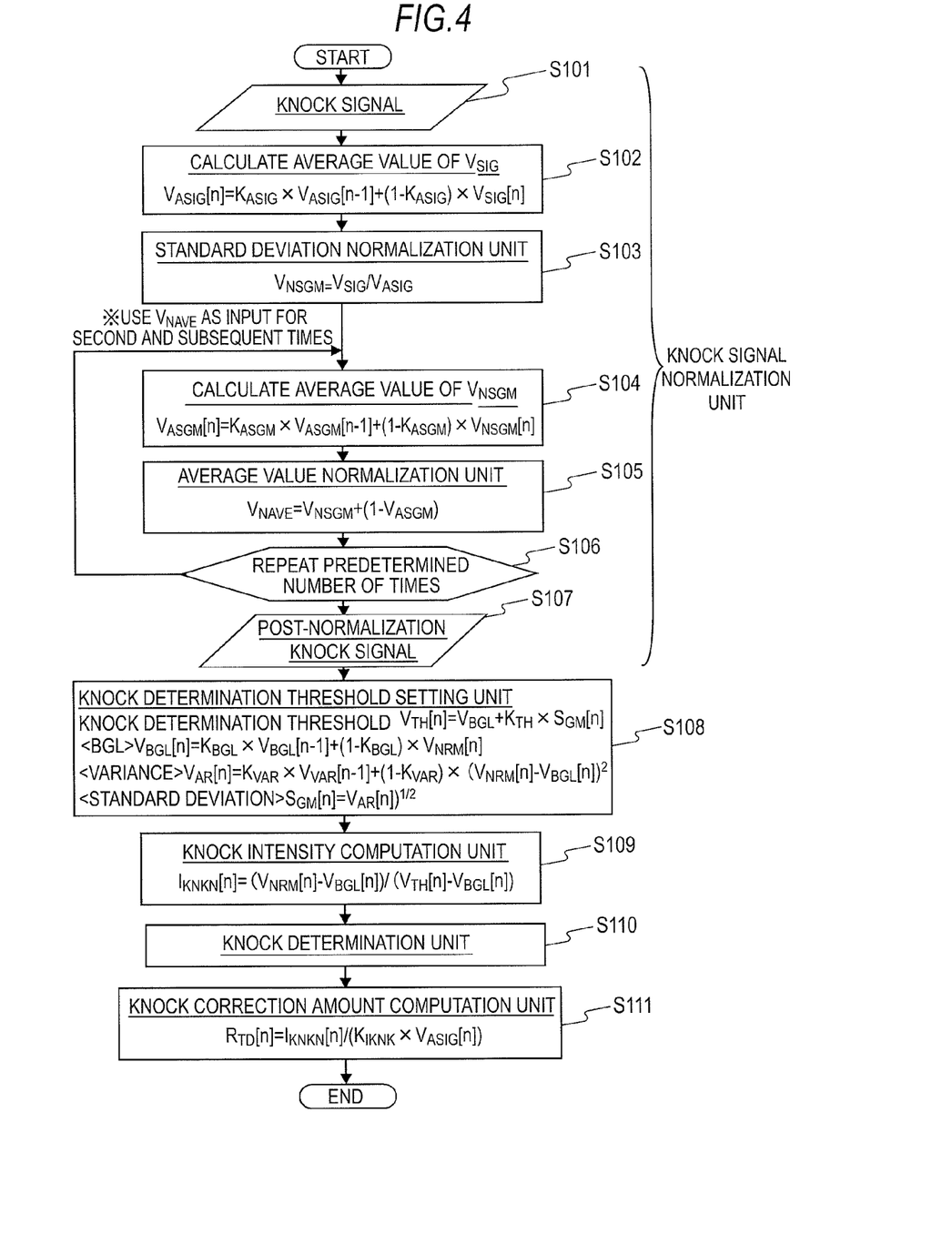
FIG. 4 is a flowchart depicting knock signal normalization processing in the control apparatus for an internal combustion engine according to the first embodiment of the invention.

Processing from the one by the knock signal normalization unit 17 to the one by the knock correction amount computation unit 21 in FIG. 3 will now be described. FIG. 4 is a flowchart depicting knock signal normalization processing in the control apparatus for internal combustion engine according to the first embodiment of the invention. The processing depicted in FIG. 4 is performed by interruption processing in synchronization with a crank angle described above, for example, by interruption processing at 75° CA BTDC.

Firstly, processing by the knock signal normalization unit 17 will be described. Steps S101 through S107 in FIG. 4 represent processing by the knock signal normalization unit 17. In Step S101, a knock signal $V_{SIG}$ outputted from the digital signal processing portion 16 is used as an input to the knock signal normalization unit 17. In the following description, a knock signal $V_{SIG}$ after it is outputted from the digital signal processing portion 16 and before it is inputted into the knock signal normalization unit 17 is referred to as a pre-normalization knock signal $V_{SIG}$.

In subsequent Step S102, a pre-normalization knock signal $V_{SIG}[n]$ is averaged by filtering the pre-normalization knock signal $V_{SIG}$ in every interruption processing step [n] at 75° CA BTDC using Equation (1) below to obtain an average value $V_{ASIG}[n]$ of the pre-normalization knock signal $V_{SIG}[n]$:

$$V_{ASIG}[n]=K_{ASIG}\times V_{ASIG}[n-1]+(1-K_{ASIG})\times V_{SIG}[n] \quad \text{Equation (1)}$$

where $K_{ASIG}$ is a filter coefficient and n is the number of interruption processing times (positive integer).

The knock signal normalization unit 17 does not make the filter coefficient $K_{ASIG}$ variable according to the determination result of the knock determination unit 20 described below. This is because the knock determination is made on the basis of the knock signal and the last calculation value of the knock determination threshold and executing similar processing during normalization of the knock signal gives rise to a delay, which makes exact normalization impossible.

In subsequent Step S103, a standard deviation of the pre-normalization knock signal $V_{SIG}[n]$ is normalized using Equation (2) below to obtain a post-standard deviation normalization knock signal $V_{NSGM}[n]$:

$$V_{NSGM}[n]=V_{SIG}[n]/V_{ASIG}[n] (\because V_{MIN}<V_{ASIG}<V_{MAX}) \quad \text{Equation (2).}$$

Herein, the knock signal minimum value $V_{MIN}$ and the knock signal maximum value $V_{MAX}$ may be set, respectively, to a value immediately before the lower limit value and a value immediately before the upper limit value of the knock signal when a state where the knock control is being performed changes to a state where the knock control is inhibited or they may be set to values preliminarily found empirically. It should be noted that Step S103 forms a standard deviation normalization unit.

In subsequent Step S104, the post-standard deviation normalization knock signal $V_{NSGM}[n]$ is averaged by filtering this signal in every interruption processing step [n] using Equation (3) below to obtain an average value $V_{ASGM}[n]$ of the post-standard deviation normalization knock signal $V_{NSGM}[n]$:

$$V_{ASGM}[n]=K_{ASGM}\times V_{ASGM}[n-1]+(1-K_{ASGM})\times V_{NSGM}[n] \quad \text{Equation (3)}$$

where $K_{ASGM}$ is a filter coefficient.

Herein, too, the filter coefficient $K_{ASGM}$ is not made variable according to the determination result of the knock determination portion 20 for the reason described above.

In subsequent Step S105, the average value $V_{ASGM}[n]$ of the post-standard deviation normalization knock signal $V_{NSGM}[n]$ is normalized using Equation (4) below to obtain a post-average value normalization knock signal $V_{NAVE}[n]$. It should be noted that Step S105 forms an average value normalization unit.

$$V_{NAVE}[n]=V_{NSGM}[n]+(1-V_{ASGM}[n]) \quad \text{Equation (4).}$$

In subsequent Step S106, the processing from Step S104 to Step S105 is repeated a predetermined number of times using the post-average value normalization knock signal $V_{NAVE}[n]$.

In subsequent Step S107, the post-average value normalization knock signal $V_{NAVE}[n]$ after the average value is normalized by repeating the processing a predetermined number of times is used as the post-normalization knock signal $V_{NRM}[n]$ for subsequent processing by the knock determination threshold setting unit 18 and the knock intensity computation unit 19.

Processing by the knock determination threshold setting unit 18 will now be described. As the knock determination threshold setting unit 18, there are a type that sets the knock determination threshold using a gain and an offset preliminarily matched to an average value of the knock signal calculated by filtering and another type that sets the knock determination threshold using an average value and a standard deviation of the knock signal calculated by filtering. Herein, a case where the knock determination threshold is set using an average value and a standard deviation will be described. Step S108 in FIG. 4 represents the processing by the knock determination threshold setting unit 18.

In Step S108, the post-normalization knock signal $V_{NRM}$[n] obtained in Step S107 described above is averaged by filtering this signal in every interruption processing step [n] using Equation (5) below to obtain a knock signal average value $V_{BGL}$[n]. It should be noted that BGL stands for a background level.

$$V_{BGL}[n] = K_{BGL} \times V_{BGL}[n-1] + K_{BGL}) \times V_{NRM}[n] \quad \text{Equation (5)}$$

where $K_{BGL}$ is a filter coefficient for BGL calculation.

Herein, the filter coefficient $K_{BGL}$ for BGL calculation is made variable according to the determination result of the knock determination unit 20 described below. For example, in a case where the presence of a knock is determined, the filter coefficient $K_{BGL}$ for BGL calculation is set to a large value whereas the filter coefficient $K_{BGL}$ for BGL calculation is set to a small value in a case where the presence of a knock is not determined (where there is no knock).

Subsequently, a variance $V_{AR}$[n] of the post-normalization knock signal $V_{NRM}$[n] is calculated using following Equation (6):

$$V_{AR}[n] = K_{VAR} \times V_{AR}[n-1] + (1-K_{VAR}) \times (V_{NRM} - V_{BGL})^2 \quad \text{Equation (6)}$$

where $K_{VAR}$ is a filter coefficient for variance calculation.

Herein, the filter coefficient $K_{VAR}$ for variance calculation is made variable according to the determination result of the knock determination unit 20. For example, in a case where the presence of a knock is determined, the filter coefficient $K_{VAR}$ for variance calculation is set to a large value whereas the filter coefficient $K_{VAR}$ for variance calculation is set to a small value in a case where the presence of a knock is not determined (where there is no knock).

Subsequently, a standard deviation $S_{GM}$[n] of the post-normalization knock signal is calculated using following Equation (7):

$$S_{GM}[n] = V_{AR}[n]^{1/2} \quad \text{Equation (7)}.$$

Subsequently, a knock determination threshold $V_{TH}$[n] is calculated on the basis of the variance $V_{AR}$[n] of the post-normalization knock signal $V_{NRM}$[n] using following Equation (8):

$$V_{TH}[n] = V_{BGL}[n] + K_{TH} \times S_{GM}[n] \quad \text{Equation (8)}$$

where $K_{TH}$ is a correction coefficient for confidence interval.

It should be noted that the coefficient for confidence interval correction, $K_{TH}$, is a value matched according to an occurrence probability of a knock and it is normally set to a value of about "3".

Processing by the knock intensity computation unit 19 will now be described. Step S109 in FIG. 4 represents the processing by the knock intensity computation unit 19. In Step S109, knock intensity $I_{KNKN}$[n] is calculated from the post-normalization knock signal $V_{NRM}$[n], the knock signal average value $V_{BGL}$[n], and the knock determination threshold $V_{TH}$[n] using following Equation (9):

$$I_{KNKN}[n] = (V_{NRM}[n] - V_{BGL}[n])/(V_{TH}[n] - V_{BGL}[n]) \quad \text{Equation (9)}.$$

In subsequent Step S110, whether a knock is occurring is determined by the knock intensity computation unit 19 on the basis of the knock-specific frequency and the knock intensity $I_{KNKN}$[n] calculated for each cylinder. Step S110 represents the processing by the knock determination unit 20.

A knock sound actually heard by the driver, however, varies significantly with a difference of the running condition of the internal combustion engine even when the knock intensity is the same. For example, even when a knock occurs at the same knock intensity, in a running region where the engine rotation is low, a knock sound sounds louder whereas a knock sound sounds softer in a running region where the engine rotation is high because it is drown out by other noise sounds. Accordingly, in a case where a knock signal is normalized, there is no difference of the knock signal average values in response to the running condition of the internal combustion engine. Hence, directly using the knock intensity $I_{KNKN}$[n] calculated using Equation (9) above makes it difficult to suppress even a difference of a knock sound caused by such a difference of the running condition.

Such being the case, a knock correction amount $R_{TD}$ to correct the knock intensity $I_{KNKN}$[n] is calculated using Equation (10) below in Step S111. Step S111 represents the processing by the knock correction amount computation unit 21.

$$R_{TD}[n] = I_{KNKN}[n]/K_{IKNK} \times V_{ASIG}[n]) \quad \text{Equation (10)}$$

where $K_{IKNK}$ is a correction coefficient for knock intensity calculation.

By using the knock correction amount corrected in this manner, the knock control apparatus for an internal combustion engine according to the first embodiment of the invention achieves knock control that suits the driver's feeling.

Figure 5:
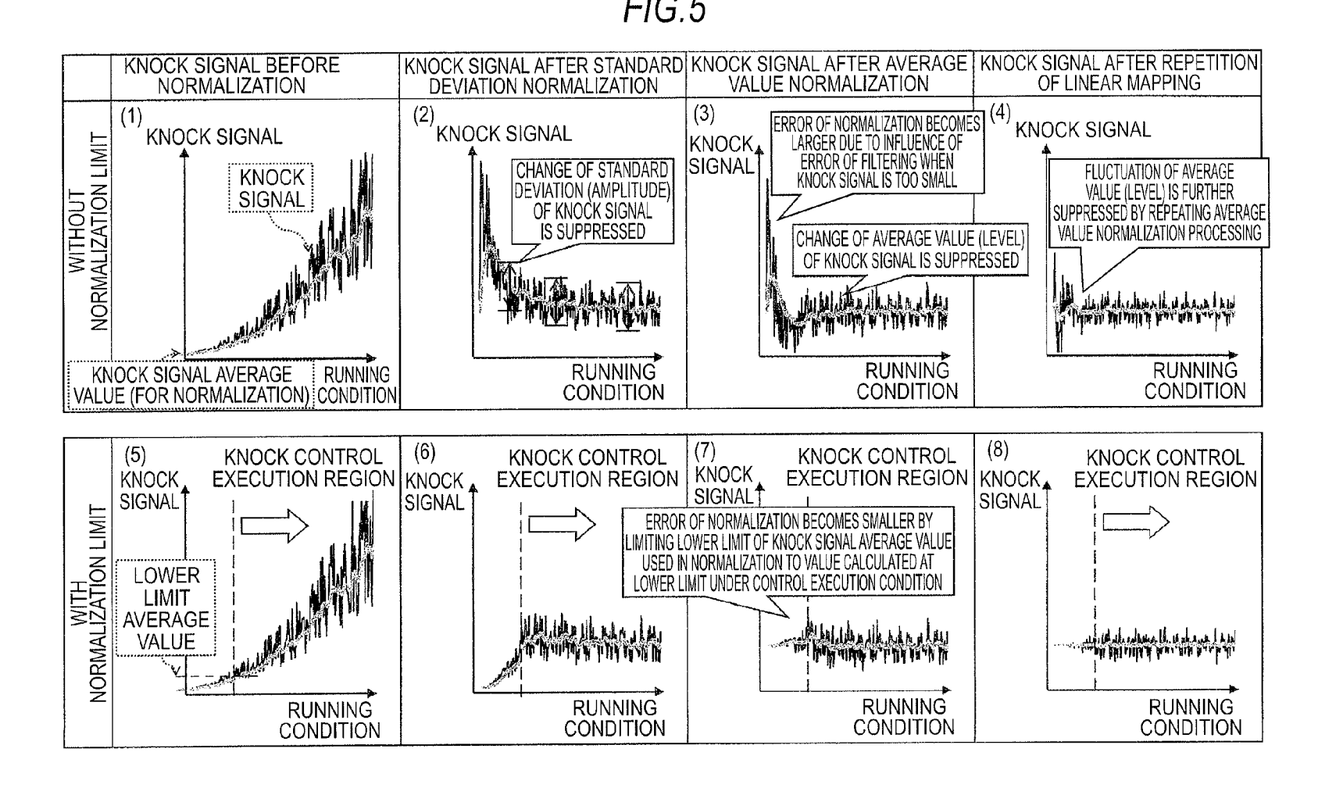
FIG. 5 is a view showing images of normalization of a knock signal in the control apparatus for an internal combustion engine according to the first embodiment of the invention.

FIG. 5 is a view showing images of the knock signal normalization in the control apparatus for an internal combustion engine according to the first embodiment of the invention. It shows images of a knock signal in a case where the knock signal is normalized in accordance with the flowchart of FIG. 4 described above when there is a change of the running condition, such as the number of rotations and a load of the internal combustion engine and a spark timing.

Referring to FIG. 5, as with (1) in FIG. 7 described above, (1) shows an image of a pre-normalization knock signal before the knock signal is normalized and an average value and a standard deviation of the knock signal vary considerably due to a difference of the running condition of the internal combustion engine. Also, (2) shows an image of the knock signal after the standard deviation is normalized and shows a manner in which a change of the amplitude of the knock signal is suppressed. Further, (3) shows an image of the knock signal after the average value of the knock signal is normalized and shows a manner in which a change of the level (magnitude) of the knock signal is suppressed. As is obvious from (2) and (3) in FIG. 5, when the knock signal is too small, an error of the normalization increases due to influences of an error of the filtering.

Also, (4) in FIG. 5 shows an image of the knock signal after normalization (linear mapping) of the average value of the knock signal has been performed repetitively and it shows a manner in which a change of the level of the knock signal is suppressed further.

It should be noted that (2), (3), and (4) in FIG. 5 show images of the knock signal when normalization is performed without limiting the average value of the knock signal used in the normalization processing.

Referring to FIG. 5 further, (5) through (8) show images of the knock signal in a case where normalization is performed by limiting the average value of the knock signal used in the normalization processing by setting the lower limit to a value immediately before falling outside of the knock control execution region. Although (5) is the same data as (1), (5)

shows the knock control execution region and the lower limit value of the knock signal average value in the knock control execution region.

Referring to FIG. 5, (6) shows an image after the standard deviation of the knock signal is normalized using the lower limit value of the knock signal average value in a region outside the knock control execution region. Also, (7) and (8) respectively show images after the normalization processing of the average value and the repetitive processing have been performed. (7) and (8) show a manner in which an increase of an error of normalization in a region other than knock control execution region is suppressed by limiting the average value used in normalization of the knock signal at the lower limit value of the knock signal average value in the knock control execution region.

Figure 6:
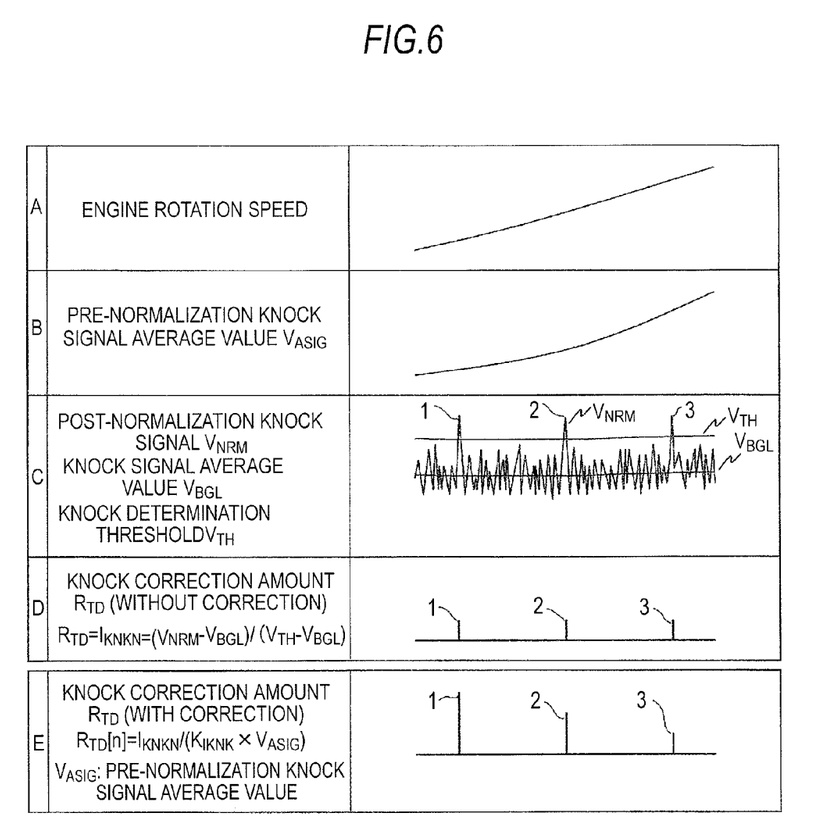
FIG. 6 is a view showing images used to describe a knock correction amount in the control apparatus for an internal combustion engine according to the first embodiment of the invention.

FIG. 6 is a view showing images used to describe a knock correction amount in the control apparatus for an internal combustion engine according to the first embodiment of the invention. Herein, a row A shows an engine rotation speed, a row B shows a pre-normalization knock signal average value, a row C shows a post-normalization knock signal, a knock signal average value, and a knock determination threshold, a row D shows a knock correction amount in a case where knock intensity is not corrected, and a row E shows a knock correction amount in a case where knock intensity is corrected using the pre-normalization knock signal average value.

Referring to FIG. 6, as is shown in the row A, the engine rotation speed changes from a low speed region to a high speed region and as is shown in the row B, the pre-normalization knock signal average value $V_{ASIG}$ changes from a small value to a large value. In this instance, the post-normalization knock signal $V_{NRM}$, the knock signal average value $V_{BLG}$, and the knock determination threshold $V_{TH}$ calculated by the computations described above are individually indicated in the image in the row C. Assume that, as is shown in the row C, the knock signal average value $V_{BGL}$ is at a level exceeding the knock determination threshold $V_{TH}$ at points 1, 2, and 3 (also assume that the values at the points 1, 2, and 3 are substantially the same). Then, when the knock intensity $I_{KNKN}[n]$ is not corrected using Equation (10) above, as is shown in the row D, we obtain [knock correction amount $R_{TD}=I_{KNKN}=(V_{NRM}-V_{BGL})/(V_{TH}-V_{BGL})$]. Hence, the knock intensity $I_{KNKN}$ becomes substantially the same level at the points 1, 2, and 3 independently of whether the engine rotation speed is in the low, medium or high speed region. Accordingly, in this case, as has been described above, a knock sound actually heard by the driver varies significantly due to a difference of the running condition of the internal combustion engine even when the knock intensity is substantially the same.

On the contrary, as is shown in the row E in FIG. 7, the knock correction amount $R_{TD}$ in a case where the knock intensity is corrected in accordance with Equation (10) above, the calculation value of the knock correction amount takes different values as indicated at the point 1, 2, and 3 for different running conditions. It thus becomes possible to achieve knock control that suits the driver's feeling.

With the knock control apparatus for an internal combustion engine according to the first embodiment of the invention, by normalizing the knock signal, it becomes possible to set the knock determination value to an adequate level independently of a change of the running condition without having to perform delicate matching processing. Further, deterioration of a signal-to-noise ratio can be suppressed by normalization of the knock signal. In addition, by calculating the knock intensity on the basis of a difference of the running condition, it becomes possible to achieve knock control that suits the driver's feeling.

The knock control apparatus for an internal combustion engine of the invention described above has the following characteristics.

(1) A knock control apparatus for an internal combustion engine according to an aspect of the invention includes: a knock sensor that detects a vibration caused by a knock of the internal combustion engine; a knock signal normalization unit that normalizes a knock signal extracted from an output signal of the knock sensor; a knock determination threshold setting unit that sets a knock determination threshold on the basis of the normalized knock signal; a knock intensity computation unit that calculates knock intensity on the basis of the normalized knock signal and the set knock determination threshold; a knock determination unit that determines a presence or absence of a knock on the basis of the calculated knock intensity; and a knock correction amount computation unit that calculates a knock correction amount to correct the calculated knock intensity in a case where an occurrence of a knock is determined by the knock determination unit, wherein the knock signal normalization unit normalizes a standard deviation of the knock signal by dividing the knock signal by an average value of the knock signal.

According to this configuration, by dividing the knock signal by an average value, which is highly correlated to a standard deviation of the knock signal but a change rate thereof at the occurrence of a knock is smaller than that of the standard deviation, it becomes possible, most importantly, to suppress only a change of the standard deviation of the knock signal in response to a change of the running condition at high accuracy without normalizing also a vibrational component caused by the occurrence of a knock. In addition, it becomes possible to normalize the average value of the knock signal to substantially "1". Further, because there is no need to calculate a standard deviation of the knock signal for normalization, a processing load can be lessened. Furthermore, because there is no need to set a constant for standard deviation calculation, man-hours for matching processing can be reduced.

(2) For the knock control apparatus for internal combustion engine of the invention, it is preferable that the knock signal normalization unit includes a standard deviation normalization unit that obtains a post-standard deviation normalization knock signal by normalizing the standard deviation of the knock signal extracted from the output signal of the knock sensor, and an average value normalization unit that normalizes the average value of the knock signal by linear mapping from the post-standard deviation normalization knock signal obtained by the standard deviation normalization unit to a predetermined value.

According to this configuration, by performing linear mapping on a signal obtained by normalizing the standard deviation of the knock signal in such a manner that an average value of this signal takes a predetermined value, the knock signal is consequently filtered to eliminate a low-frequency component thereof. Accordingly, a change of the average value of the knock signal in response to a change of the running condition can be suppressed further. It thus becomes possible to suppress continuation of a wrong knock determination caused by a change of the running condition.

(3) For the knock control apparatus for internal combustion engine of the invention, it is preferable that processing of the linear mapping from the average value of the signal processed by the average value normalization unit to the predetermined value is repeated a predetermined number of times.

According to this configuration, by repetitively performing linear mapping, the order of the filter that eliminates a low-frequency component of the knock signal is increased. Accordingly, a change of the average value of the knock signal can be further suppressed. It thus becomes possible to suppress continuation of a wrong knock determination caused by a change of the running condition.

(4) For the knock control apparatus for internal combustion engine of the invention, it is preferable that the standard deviation normalization unit normalizes the standard deviation of the knock signal using the average value of the knock signal immediately before execution of knock control is inhibited in a state where execution of the knock control is inhibited.

According to this configuration, it becomes possible to prevent deterioration of accuracy of normalization caused by performing a division operation using too small a average value.

(5) For the knock control apparatus for an internal combustion engine of the invention, it is preferable that the knock correction amount calculated by the knock correction amount computation unit is an amount by which the knock intensity computed by the knock intensity computation unit has been corrected using the knock intensity calculated by the knock intensity computation unit and the knock signal before normalization by the knock signal normalization unit.

According to this configuration, the knock determination threshold is set and the knock determination is made on the basis of the post-normalization knock signal. It thus becomes possible to set the knock determination threshold and make a knock determination at high accuracy independently of a change of the running condition. Also, because a knock sound is readily heard by the driver in a state where, for example, a knock signal is small (a state where an engine noise per se is quiet), it becomes possible to calculate a large correction amount for the calculated knock intensity by correcting a knock correction amount using the pre-normalization knock signal. Knock control that suits the driver's feeling can be thus performed.

Various modifications and alterations of this invention will be apparent to those skilled in the art without departing from the scope and spirit of this invention, and it should be understood that this is not limited to the illustrative embodiments set forth herein.

What is claimed is:

1. A knock control apparatus for an internal combustion engine, comprising:
    a knock sensor that detects a vibration caused by a knock of the internal combustion engine;
    a knock signal normalization unit that normalizes a knock signal extracted from an output signal of the knock sensor and obtains the normalized knock signal;
    a knock determination threshold setting unit that sets a knock determination threshold on the basis of the normalized knock signal;
    a knock intensity computation unit that calculates knock intensity on the basis of the normalized knock signal and the set knock determination threshold;
    a knock determination unit that determines a presence or absence of a knock on the basis of the calculated knock intensity; and
    a knock correction amount computation unit that calculates a knock correction amount to correct the calculated knock intensity in a case where an occurrence of a knock is determined by the knock determination unit,
    wherein the knock signal normalization unit is configured to obtain the normalized knock signal by normalizing a standard deviation of the knock signal by dividing the extracted knock signal by an average value of the knock signal.

2. The knock control apparatus for an internal combustion engine according to claim 1, wherein the knock signal normalization unit includes:
    a standard deviation normalization unit that obtains the normalized knock signal by normalizing the standard deviation of the knock signal extracted from the output signal of the knock sensor; and
    an average value normalization unit that normalizes the average value of the knock signal by linear mapping from the normalized knock signal obtained by the standard deviation normalization unit to a predetermined value.

3. The knock control apparatus for an internal combustion engine according to claim 2, wherein processing of the linear mapping from the average value of the signal processed by the average value normalization unit to a predetermined value is repeated a predetermined number of times.

4. The knock control apparatus for an internal combustion engine according to claim 3, wherein the standard deviation normalization unit normalizes the standard deviation of the knock signal using the average value of the knock signal immediately before execution of knock control is inhibited in a state where execution of the knock control is inhibited.

5. The knock control apparatus for an internal combustion engine according to claim 4, wherein the knock correction amount calculated by the knock correction amount computation unit is an amount by which the knock intensity computed by the knock intensity computation unit has been corrected using the knock intensity calculated by the knock intensity computation unit and the knock signal before normalization by the knock signal normalization unit.

6. The knock control apparatus for an internal combustion engine according to claim 3, wherein the knock correction amount calculated by the knock correction amount computation unit is an amount by which the knock intensity computed by the knock intensity computation unit has been corrected using the knock intensity calculated by the knock intensity computation unit and the knock signal before normalization by the knock signal normalization unit.

7. The knock control apparatus for an internal combustion engine according to claim 2, wherein the standard deviation normalization unit normalizes the standard deviation of the knock signal using the average value of the knock signal immediately before execution of knock control is inhibited in a state where execution of the knock control is inhibited.

8. The knock control apparatus for an internal combustion engine according to claim 7, wherein the knock correction amount calculated by the knock correction amount computation unit is an amount by which the knock intensity computed by the knock intensity computation unit has been corrected using the knock intensity calculated by the knock intensity computation unit and the knock signal before normalization by the knock signal normalization unit.

9. The knock control apparatus for an internal combustion engine according to claim 2, wherein the knock correction amount calculated by the knock correction amount computation unit is an amount by which the knock intensity computed by the knock intensity computation unit has been corrected using the knock intensity calculated by the knock intensity computation unit and the knock signal before normalization by the knock signal normalization unit.

10. The knock control apparatus for an internal combustion engine according to claim 1, wherein the knock correction amount calculated by the knock correction amount computation unit is an amount by which the knock intensity computed by the knock intensity computation unit has been corrected using the knock intensity calculated by the knock intensity computation unit and the knock signal before normalization by the knock signal normalization unit.

11. The knock control apparatus for an internal combustion engine according to claim 1, wherein the knock signal normalization unit is configured to obtain the normalized knock signal by using an expression:

$$V_{NSGM}[n] = V_{SIG}[n]/V_{ASIG}[n],$$

where $V_{NSGM}[n]$ is a value of the normalized knock signal,
$V_{SIG}[n]$ is a value of the knock signal,
$V_{ASIG}[n]$ is the average value of the knock signal, and
n is a number of interruption processing times.

* * * * *